United States Patent
Fusenig et al.

(10) Patent No.: US 11,120,124 B2
(45) Date of Patent: Sep. 14, 2021

(54) METHOD FOR DETECTING A DEVIATION OF A SECURITY STATE OF A COMPUTING DEVICE FROM A DESIRED SECURITY STATE

(71) Applicant: Siemens Aktiengesellschaft, Munich (DE)

(72) Inventors: Volker Fusenig, Munich (DE); Jan Stijohann, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 164 days.

(21) Appl. No.: 16/097,337

(22) PCT Filed: Mar. 21, 2017

(86) PCT No.: PCT/EP2017/056651
§ 371 (c)(1),
(2) Date: Oct. 29, 2018

(87) PCT Pub. No.: WO2017/186412
PCT Pub. Date: Nov. 2, 2017

(65) Prior Publication Data
US 2019/0138713 A1 May 9, 2019

(30) Foreign Application Priority Data
Apr. 28, 2016 (EP) .................... 16167465

(51) Int. Cl.
*G06F 21/53* (2013.01)
*G06F 21/55* (2013.01)
(Continued)

(52) U.S. Cl.
CPC .......... *G06F 21/53* (2013.01); *G06F 9/45558* (2013.01); *G06F 21/55* (2013.01);
(Continued)

(58) Field of Classification Search
CPC ...... G06F 21/53; G06F 21/55; G06F 9/45558; G06F 21/561; G06F 21/577; G06F 2009/45587; G06F 2221/034
See application file for complete search history.

(56) References Cited

U.S. PATENT DOCUMENTS 8,904,525 B1 * 12/2014 Hodgman ............. G06F 21/567
726/22
9,081,617 B1 * 7/2015 Pendharkar ......... G06F 9/45558
(Continued)

FOREIGN PATENT DOCUMENTS

CN 104468734 3/2015

OTHER PUBLICATIONS

IP.com Search Query Aug. 12, 2020 (Year: 2020).*
(Continued)

*Primary Examiner* — Samson B Lemma
*Assistant Examiner* — Blake I Narramore
(74) *Attorney, Agent, or Firm* — Cozen O'Connor

(57) ABSTRACT

A device, computer program product and method for detecting a deviation of a security state of a computing device from a desired security state, wherein the computing device is emulated by a virtual machine, where the includes the creation of a virtual copy of the virtual machine, the creation occurring during runtime of the virtual machine with operation of the computing device continuing unimpaired, the automatic start of operation of the virtual copy, automatic performance of a security check on the virtual copy with operation of the computing device continuing unimpaired, automatic generation of a result of the security check which describes a security state of the virtual copy, and includes creation of a threat indication for the computing device if the result indicates a deviation of the security state of the virtual copy from the desired security state of the computing device.

18 Claims, 2 Drawing Sheets

(51) Int. Cl.
  *G06F 9/455* (2018.01)
  *G06F 21/56* (2013.01)
  *G06F 21/57* (2013.01)
(52) U.S. Cl.
  CPC .......... *G06F 21/561* (2013.01); *G06F 21/577* (2013.01); *G06F 2009/45587* (2013.01); *G06F 2221/034* (2013.01)

(56) References Cited

U.S. PATENT DOCUMENTS

| | | | | |
|---|---|---|---|---|
| 2010/0017512 | A1* | 1/2010 | Ciano | G06F 9/455 709/225 |
| 2011/0191852 | A1* | 8/2011 | Sanders | G06F 9/455 726/25 |
| 2012/0304170 | A1* | 11/2012 | Morgan | G06F 9/45558 718/1 |
| 2013/0042115 | A1* | 2/2013 | Sweet | H04L 63/20 713/176 |
| 2013/0246685 | A1* | 9/2013 | Bhargava | G06F 21/00 711/6 |
| 2013/0247032 | A1* | 9/2013 | Bhargava | G06F 11/3006 718/1 |
| 2014/0137115 | A1* | 5/2014 | Tosa | H04L 63/08 718/1 |
| 2014/0372717 | A1* | 12/2014 | Ciu | G06F 21/53 711/162 |
| 2016/0314297 | A1* | 10/2016 | Tu | G06F 9/45558 |
| 2016/0378527 | A1* | 12/2016 | Zamir | G06F 3/0665 711/162 |
| 2016/0378528 | A1* | 12/2016 | Zamir | G06F 3/065 711/162 |
| 2017/0235951 | A1* | 8/2017 | Harrison | G06F 8/61 726/24 |
| 2018/0260251 | A1* | 9/2018 | Beveridge | G06F 9/45558 |
| 2018/0359264 | A1* | 12/2018 | Sweet | G06F 21/577 |

OTHER PUBLICATIONS

IP.com Search Query Dec. 3, 2020 (Year: 2020).*
PCT International Search Report and Written Opinion of International Searching Authority dated Jun. 6, 2017 corresponding to PCT International Application No. PCT/EP2017/056651 filed Mar. 21, 2017.
Office Action dated May 7, 2021 issued in Chinese Patent Application No. 201780025783.0.

* cited by examiner

METHOD FOR DETECTING A DEVIATION OF A SECURITY STATE OF A COMPUTING DEVICE FROM A DESIRED SECURITY STATE

CROSS-REFERENCE TO RELATED APPLICATIONS

This is a U.S. national stage of application No. PCT/EP2017/056651 filed Mar. 21, 2017. Priority is claimed on EP Application No. 16167465 filed Apr. 28, 2016, the content of which is incorporated herein by reference in its entirety.

BACKGROUND OF THE INVENTION

1. Field of the Invention

The invention relates to a device, computer program product and method for detecting a deviation of a security state of a computing device from a desired security state.

2. Description of the Related Art

Software on data processing installations is checked by performing IT security checks or IT security programs that, e.g., detect malware and possibly render it harmless. By way of example, virus scanners are employed to prevent damage on a computer or on a computation installation, or forensic analyses in order to reconstruct a security incident. In particular, disturbances in the operation of an installation, such as a control installation, the theft of data or the spread of data to other systems, are intended to be prevented. Typically, software for security analysis, for example, a virus scanner, is installed on a target system. The target system is the system to be examined and the analysis is effected on the target system. An installed piece of analysis software often influences the operation of the system, for example, through losses of performance, violation of real-time requirements or incompatibilities with other software installed on the target system. Additionally, a piece of security analysis software often erroneously takes action in legitimate or harmless processes or blocks them.

In virtualized systems, it is a generally known practice to perform a virus scan from outside. This means that the software is not installed on the target system, but rather runs on a hypervisor level. This means that the analysis software can access an image of the virtual machine at the target system and can analyze what are known as application programming interface calls, API calls for short, the hypervisor ensuring that the virtual machine has the promised resources available. In this case, the virtual machine is the virtual map of the target system, i.e., by way of example, a computer on which the target system is operated virtually. In specific virtualization environments, virus scans are generally known for detecting malware. Further, it is a known practice to install what is known as an agent on the target system that forwards data for checking for viruses to another system, again a virtual machine. This reduces the computation load for virus checks on the target system itself.

Similarly, physical protective measures or isolations of networks are known that prevent infection with malware by separating systems requiring security.

SUMMARY OF THE INVENTION

It is an object of the present invention to provide a method for detecting a threat state for a computation device in real time.

This and other objects and advantages are achieved in accordance with the invention by a method for detecting a deviation in a security state of a computation device from a desired security state, where the computation device is mapped by a virtual machine, and where the method comprises creating a virtual copy of the virtual machine, the creating being performed during runtime of the virtual machine and operation of the computation device being continued unimpaired, automatically starting operation of the virtual copy, automatically performing a security check on the virtual copy, the operation of the computation device being continued unimpaired, automatically generating a result of the security check which describes a security state of the virtual copy, and creating a threat indication for the computation device if the result indicates a deviation in the security state of the virtual copy from the desired security state of the computation device.

A computation device is understood to mean a computer or a computer installation for realizing an IT system, such as a control computer. The security state of this computation device is defined by the result of a security check. If the security check performed is a virus scan, for example, and no virus is found, then the result is a virus-free state and the security state can be denoted by a memory entry 'virus free', for example, which is created during the security check. The desired security state is defined for the computation device from outside or in advance or after assessment during operation and can in particular have, as one component, the feature that freedom from viruses needs to have been attested. The desired security state can be formed by an interaction between many different characterizing properties of the computation device. By way of example, a multiplicity of tags may have been prescribed in the desired security state that, in particular occurring together in different combinations, classify the computation device as secure.

The computation device to be tested is formed in a virtualized manner, for example, as a virtual machine on a popular virtualization environment such as VM-ware, for example, or in a public cloud. Therefore, a method is presented that checks a virtual machine for security and takes this check as a basis for inferring the real computation device.

The virtual machine to be tested is initially copied. Popular virtualization environments can copy or clone virtual machines at runtime without impairing the operation of the original system. The copy, also called a fork, is started automatically. In particular, the start in the case of a fork is not performed explicitly, but rather the start of the virtual machine is triggered by the actual creation of the copy. It is now possible for tests to be performed on the running test system at the virtual copy for the security check, for example, a port scan is performed or API call monitoring. Further, it is alternatively or additionally possible for software to be installed and executed on the test system, such as virus scanners, and detailed analyses of log files or files, such as forensic analyses.

The evolvement of the test or the generated test results can subsequently be evaluated. A result of the security check is generated that describes the security state of the virtual copy. The virtual copy is a 1:1 copy of the virtual original system. Consequently, the results simultaneously provide information on the security state of this virtual original system. Simultaneously, information about the security state of the real computer unit is therefore also available.

The method described involves capturing the security state and displaying a threat that is present. In a next step, security problems on the computation device, i.e., the real original system, can be rectified, such as during scheduled maintenance or during updates.

The steps for creating the virtual copy can be performed in an automated manner. Popular tools are used to perform the creation of snapshots or the copying of snapshots or the execution thereof or the installation and execution of software on the copy of the virtual machine in an automated manner.

Therefore, no sophisticated manual security assessment on a test system is necessary. Such test systems modeled on a real system have the identical software installed on them in a sophisticated manner with the same configuration in order to prevent the original system from crashing as a result of the assessment. The presented method advantageously allows a manual security assessment to be absent. The security check can be performed on a running system without influencing the operation thereof. The security check is therefore effected in a decoupled manner. As all checks are performed on a copy of the system, it is also possible for invasive tests to be performed or additional software to be installed. In particular, there is no need for actions or configuration changes to be performed on the original system, and it is thus possible to ensure that the checks do not influence the operation of the original computation system. As a result, by way of example, the method can also allow the use of virus scanners in a setting in which normally, e.g., based on safety requirements, a virus scan is not possible.

An already existing virtualized system requires no kind of adaptation and the proposed method can be operated as a program on an additional virtual machine.

Besides the performance, the functionality and stability of the system to be tested are also not influenced.

Unlike in the case of solutions from the cloud setting, any desired standard software can be employed for the security check. The method can moreover spot an existing security problem or a malware infection in good time before effects of the malware occur on the system. Many critical systems afford separation from other networks as the only protection, which cannot provide 100% protection, however. For systems such as these, the method affords an additional protection by virtue of attacks or infestation with malware being able to be detected in good time in this case too. The possibility of performing the security check in an automated manner means that the method can advantageously be performed automatically on a regular basis, such as daily.

In accordance with one embodiment, the desired security state of the computation device is concordant with the desired security state of the virtual copy. As a result of the properties of the virtual copy, meaning that it is a 1:1 copy of the virtual machine, the desired security state of the virtual copy is concordant with the desired security state of the virtual machine and hence of the virtualized computation device. Therefore, the desired security state of the computation device is in turn described by the desired security state of the copy of the virtual machine.

In accordance with another embodiment, the virtual copy and the virtual machine are executed on a common computer structure. Thus, it is advantageously possible for the copy to be left on the same host system, in particular an identical physical computer, for the further analysis. Therefore, it is advantageously not necessary for data to be transmitted to another computer, which could lead to confidentiality problems with the data or could entail performance disadvantages. The computer host could therefore run with the original system and the cloned system completely in isolation from other networks, for example, from an intranet or an Ethernet. Coupling to another network that could decrease the security of the system is therefore prevented. In an embodiment, the virtual copy and the virtual machine are also virtualized on a common virtualization environment. This allows particularly simple realization given limited resources.

In accordance with an embodiment, the virtual copy is moved to a separate physical computer, different than a computer structure of the virtual machine, for performing the security check. The separate physical computer can be operated in a less secure environment than the original system, for example. Advantageously, the cloned system can have an Internet or intranet connection, even if the original system is operated only in a closed network. As a result, latest virus updates can be used for the analysis, for example, or more in-depth examinations can be performed by experts remotely without increasing the target of the original system.

In accordance with a further embodiment, the move is effected via a secure interface. For transmission purposes, a dedicated and secure interface from the secure to the non-secure environment is provided. There is a potential weakness at that point. Consequently, an accordingly well-protected interface is necessary therefor.

In another embodiment, the separate physical computer is realized in a less secure environment than the computer structure.

In a further embodiment, a threat indication results in the desired security state of the computation device being restored on the computation device, in particular by performing a repair or maintenance. The threat indication is displayed on a user interface of the computation device, for example. By way of example, it is forwarded to a server that centrally manages or prompts maintenance measures for individual computers of an installation. Alternatively, a catalog of measures is provided for created threat indications that is able to be taken as a basis for automatically initiating repair measures by the computation device.

In a further embodiment, the virtual copy is created by virtue of an image of the virtual machine being copied and a current main memory being stored. Therefore, the current security state of a computation device is mapped comprehensively and taken as a basis for the check.

In a further embodiment, performing the security check involves performing the virus scan or analyzing log data records or files.

In a further embodiment, the virtual copy is discarded after the result is generated. In particular, a result of the check is stored in a log entry before the copy is discarded.

It is also an object of the invention to provide an apparatus for detecting a deviation in a security state of a computation device from a desired security state, where the computation device is mapped by a virtual machine. The apparatus includes a copying unit for creating a virtual copy of the virtual machine, the creating being performable during the runtime of the virtual machine and operation of the computation device being continuable unimpaired, a checking unit for automatically performing a security check on the virtual copy, the operation of the computation device being continuable unimpaired, and for automatically generating a result of the security check which describes a security state of the virtual copy, and an output unit for outputting a threat indication for the computation device if the result indicates a deviation in the security state of the virtual copy from the desired security state of the computation device.

In accordance with one embodiment, the checking unit is provided on a common computer structure with the virtual machine.

In accordance with one embodiment, the checking unit is provided on a separate physical computer different than a computer structure of the virtual machine.

It is also an object of the invention to provide a non-transitory computer program product having a computer program that has means for performing the method described above when the computer program is executed on a program-controlled device.

A computer program product, such as a computer program means, can be provided or supplied as a storage medium, such as a memory card, USB stick, CD-ROM, DVD, or else in the form of a downloadable file, for example, by a server in a network. This can be effected in a wireless communication network by virtue of the transmission of an appropriate file having the computer program product or the computer program means, for example. A possible program-controlled device is in particular a control device, such as a microprocessor for a smartcard or the like.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below on the basis of exemplary embodiments with reference to the figures, in which.

DETAILED DESCRIPTION OF THE EXEMPLARY EMBODIMENTS

In the figures, elements having the same function are provided with the same reference signs, unless indicated otherwise.

Figure 1:
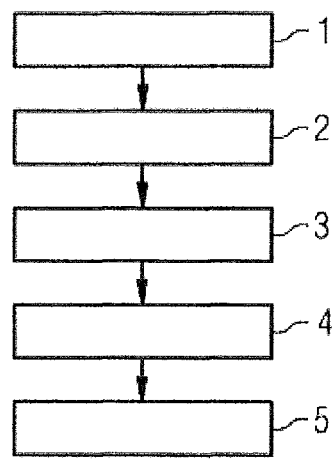
FIG. 1 shows a schematic depiction of a flowchart to illustrate a method for detecting a deviation in a security state of a computation device from a desired security state according to a first exemplary embodiment of the invention.

FIG. 1 schematically illustrates how a method for detecting a deviation in a security state of a computation device in accordance with a first exemplary embodiment of the invention proceeds. In a first step, a virtual copy 1 of a virtual machine is created. The virtual machine is the virtual map or virtual machine image of the computation device. The computation device is characterized by a desired security state defining those features of the computation device whose presence promises a correct or unthreatened security state. In this ideal state, all criteria for the configuration of the computation device or the software installed thereon are satisfied, for example. By way of example, the achievement or presence of the desired security state is acknowledged after particular tests or checks have been successfully passed. By way of example, the desired security state describes the security state at a time of delivery, at which the computation device is classified as unthreatened or intact.

The creation of the virtual copy 1 of the virtual machine is effected during the runtime of the virtual machine itself, which means that operation of the computation device is continued unimpaired. The virtual copy of the virtual machine is a copy of the virtual map or virtual machine image, which means that the virtual map of the computation device is present identically in duplicate and is executed in parallel with one another. Operation of the virtual copy is started automatically 2. In the chronologically subsequent third step, a security check 3 is automatically performed on the virtual copy. Again, the operation of the computation device remains completely unaffected by the execution of the processes initiated by the security check. Thus, the realtime requirement for the computation device is met despite the security check proceeding.

In the subsequent step, a result is automatically generated 4 that describes the security state of the virtual copy based on the security check performed. Here, identifiers such as configuration properties are described, for example, or the test results from various security tests are recorded in a tabular list, such as by specifying the feature "passed"/"not passed".

The result can further be analyzed to determine whether, viewed as a whole, the presence of the desired security state can be assumed, or whether the individual components of the result mean that there is a deviation in the ascertained security state of the virtual copy from the desired security state and a threat to the virtual copy, and hence to the virtual machine and, hence, ultimately to the computation device. The creation of the threat indication 5 can be performed automatically or on request when prompted by the computation device.

Figure 2:
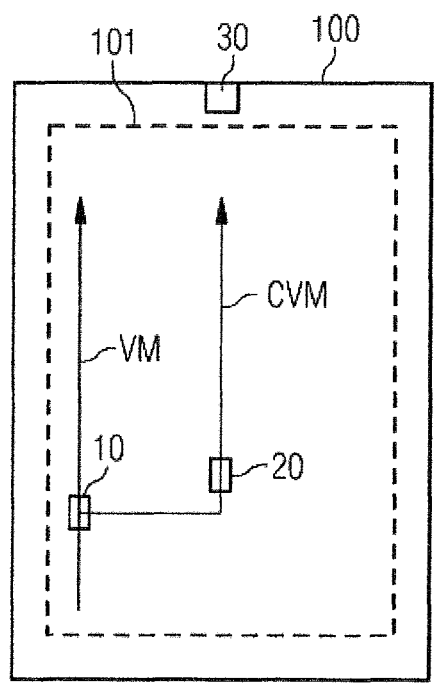
FIG. 2 shows a schematic depiction of an apparatus for detecting a deviation in a security state of a computation device from a desired security state according to a second exemplary embodiment of the invention.

FIG. 2 schematically portrays an apparatus in accordance with a second exemplary embodiment of the invention that detects a threat state for a computation device in real time. The apparatus 100 has a copying unit 10 that creates the virtual copy CVM of the virtual machine VM. By way of example, this involves the creation of a fork, in the case of which the virtual machine VM itself continues to run unimpaired. A checking unit 20 is provided for automatically performing the security check on the virtual copy CVM. The virtual machine VM itself is not used by the checking unit 20 for computation steps for the security check. As a result, the operation of the virtual machine VM and, hence, the operation of the computation device continue unimpaired. The copying unit 10 and the checking unit 20 are realized on a common computer structure 101. The output unit 30 may be implemented in the apparatus 100 in a different manner. In particular, the output unit 30 forms an interface to the computation device at the same time. The computation device itself can then react, depending on whether or not there is a threat indication, via a repair or maintenance or the loading or installation of a new piece of software. By way of example, a control process is interrupted or a data processing process is adapted until the security flaw is rectified.

Figure 3:
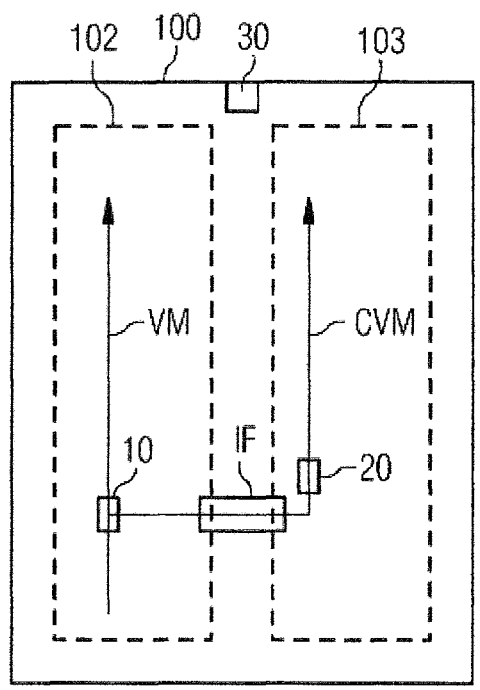
FIG. 3 shows a schematic depiction of an apparatus for detecting a deviation in a security state of a computation device from a desired security state according to a third exemplary embodiment of the invention.

FIG. 3 schematically depicts how, in accordance with a third exemplary embodiment of the invention, isolated computer structures 102, 103 are provided for the virtual machine VM and the copy of the virtual machine CVM. In particular, the checking unit 20 is provided on a separate physical computer 103. An interface IF connects the two computer structures and is, in particular at the same time, the gateway from a secure zone, in which the process sequences of the virtual machine VM proceed, to a less secure zone, in which the check on the copy of the virtual machine CVM takes place.

Although the invention has been illustrated and described in detail by the exemplary embodiments, the invention is not limited by the disclosed examples, and other variations can be derived therefrom by a person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for detecting a deviation in a security state of a computation device from a desired security state which is defined for the computation device one of (i) externally, (ii) in advance and (iii) after an assessment performed during operation, the computation device being mapped by a virtual machine, the method comprising: creating a virtual copy of an entirety of the virtual machine, said creating being performed during runtime of the virtual machine and operation of the computation device being continued unimpaired; starting operation of the virtual copy automatically; performing a security check on the virtual copy automatically, the operation of the computation device being continued unimpaired; generating a result of the security check automatically, the result describing a security state of the virtual copy; and creating a threat indication for the computation device if the result indicates a deviation in the security state of the virtual copy from the desired security state of the computation device which is defined for the computation device one of (i) externally, (ii) in advance and (iii) after the assessment performed during operation.

2. The method as claimed in claim 1, wherein the desired security state of the computation device is concordant with the desired security state of the virtual copy.

3. The method as claimed in claim 1, wherein the virtual copy and the virtual machine are executed on a common computer structure.

4. The method as claimed in claim 2, wherein the virtual copy and the virtual machine are executed on a common computer structure.

5. The method as claimed in claim 1, wherein the virtual copy is moved to a separate physical computer, different than a computer structure of the virtual machine, for performing the security check.

6. The method as claimed in claim 2, wherein the virtual copy is moved to a separate physical computer, different than a computer structure of the virtual machine, for performing the security check.

7. The method as claimed in claim 5, wherein the move is effected via a secure interface.

8. The method as claimed claim 5, wherein the separate physical computer is realized in a less secure environment than the computer structure.

9. The method as claimed claim 7, wherein the separate physical computer is realized in a less secure environment than the computer structure.

10. The method as claimed in claim 1, wherein a threat indication results in the desired security state of the computation device being restored on the computation device by performing a repair or maintenance.

11. The method as claimed in claim 1, wherein the virtual copy is created by virtue of an image of the virtual machine being copied and a current main memory being stored.

12. The method as claimed in claim 1, wherein performing the security check involves performing one of (i) a virus scan and (ii) analyzing log data records or files.

13. The method as claimed in claim 1, wherein the virtual copy is discarded after the result is generated.

14. An apparatus for detecting a deviation in a security state of a computation device from a desired security state which is defined for the computation device one of (i) externally, (ii) in advance and (iii) after an assessment performed during operation, the computation device being mapped by a virtual machine, the apparatus comprising: a processor; memory; a copier which creates a virtual copy of an entirety of the virtual machine, said creation being performable during runtime of the virtual machine and operation of the computation device being continuously unimpaired; a checker which automatically performs a security check on the virtual copy, the operation of the computation device being continuously unimpaired, and which automatically generates a result of the security check which describes a security state of the virtual copy; and a threat indicator which outputs a threat indication for the computation device if the result indicates a deviation in the security state of the virtual copy from the desired security state of the computation device which is defined for the computation device one of (i) externally, (ii) in advance and (iii) after the assessment performed during operation.

15. The apparatus as claimed in claim 14, wherein the checker is provided on a common computer structure with the virtual machine.

16. The apparatus as claimed in claim 14, wherein the checker is provided on a separate physical computer different than a computer structure of the virtual machine.

17. The apparatus as claimed in claim 16, further comprising:
a secure interface between the computer structure of the virtual machine and the physical computer.

18. A non-transitory computer program product encoded with a computer program executed by on program-controlled device which causes detection of a deviation in a security state of a computation device from a desired security state which is defined for the computation device one of (i) externally, (ii) in advance and (iii) after an assessment performed during operation, the computation device being mapped by a virtual machine, the computer program comprising: program code for creating a virtual copy of an entirety of the virtual machine, said creating being performed during runtime of the virtual machine and operation of the computation device being continued unimpaired; program code for starting operation of the virtual copy automatically; program code for performing a security check on the virtual copy automatically, the operation of the computation device being continued unimpaired; program code for generating a result of the security check automatically, the result describing a security state of the virtual copy; and program code for creating a threat indication for the computation device if the result indicates a deviation in the security state of the virtual copy from the desired security state of the computation device which is defined for the computation device one of (i) externally, (ii) in advance and (iii) after the assessment performed during operation.

* * * * *